US012576993B2

(12) United States Patent
Jung et al.

(10) Patent No.: US 12,576,993 B2
(45) Date of Patent: Mar. 17, 2026

(54) METHOD AND SYSTEM FOR OPERATING METAVERSE PLATFORM FOR IMPLEMENTING VIRTUAL UNIVERSE SPACE

(71) Applicant: Korea Aerospace Research Institute, Daejeon (KR)

(72) Inventors: Youeyun Jung, Daejeon (KR); Okchul Jung, Daejeon (KR); Jaedong Seong, Daejeon (KR); Saehan Song, Daejeon (KR); Myeongshin Lee, Daejeon (KR); Daewon Chung, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 210 days.

(21) Appl. No.: 18/523,749

(22) Filed: Nov. 29, 2023

(65) Prior Publication Data

US 2024/0174384 A1 May 30, 2024

(30) Foreign Application Priority Data

Nov. 30, 2022 (KR) ........................ 10-2022-0164272

(51) Int. Cl.
B64G 1/24 (2006.01)
B64G 3/00 (2006.01)
(Continued)

(52) U.S. Cl.
CPC .............. B64G 1/244 (2019.05); B64G 3/00 (2013.01); G06T 7/70 (2017.01); G06T 17/00 (2013.01);
(Continued)

(58) Field of Classification Search
CPC .. B64G 1/244; B64G 3/00; G06T 7/70; G06T 2207/10032; G06T 17/00; H04L 63/105; G06N 3/006
See application file for complete search history.

(56) References Cited

U.S. PATENT DOCUMENTS

| | | | |
|---|---|---|---|
| 11,780,612 B1* | 10/2023 | Kopardekar | B64G 1/14 701/13 |
| 2016/0056957 A1* | 2/2016 | Clarke | H04L 9/0825 380/285 |

(Continued)

FOREIGN PATENT DOCUMENTS

| | | |
|---|---|---|
| JP | 2007226614 A | 9/2007 |
| KR | 10-0427575 B1 | 4/2004 |

(Continued)

OTHER PUBLICATIONS

Hitchens, "Crider: SSA Data 'Library' Will Open To Allies", https://breakingdefense.com/2019/05/crider-ssa-data-library-will-open-to-allies/, May 3, 2019 (Year: 2019).*
(Continued)

*Primary Examiner* — Amelia Vorce
(74) *Attorney, Agent, or Firm* — Workman Nydegger

(57) ABSTRACT

Disclosed is a metaverse platform operating method and system for implementing a virtual universe space. The metaverse platform operating method includes: obtaining a plurality of satellite data from a satellite vehicle on a predetermined period for a predetermined time; constructing space situational awareness (SSA) information associated with the satellite vehicle by processing the plurality of satellite data; generating a metaverse-based virtual universe space in which the satellite vehicle is positioned for the predetermined time, through three-dimensional (3D) modeling of the SSA information; at an access request from a device, identifying a satellite-related organization to which
(Continued)

Screen 400

Function of providing STM for a satellite vehicle /420

Metaverse-based virtual universe space ~~430

Function of designing a close robotic mission by linkage to real-time satellite data and 3D data and displaying a mission situation in real time /440

Avatar 401

Avatar 402

410

Modularized function the device belongs, using a login account included in the access request; and visualizing the metaverse-based virtual universe space on the device according to an information access right of the satellite-related organization.

15 Claims, 6 Drawing Sheets

(51) Int. Cl.
    *G06T 7/70*        (2017.01)
    *G06T 17/00*      (2006.01)
    *H04L 9/40*       (2022.01)

(52) U.S. Cl.
    CPC .. *H04L 63/105* (2013.01); *G06T 2207/10032* (2013.01)

(56) References Cited

U.S. PATENT DOCUMENTS

| | | | | |
|---|---|---|---|---|
| 2018/0268605 | A1 * | 9/2018 | Jia | G06T 1/20 |
| 2020/0278445 | A1 * | 9/2020 | Stevenson | G01S 13/103 |
| 2021/0292011 | A1 * | 9/2021 | Limotta | G06N 3/04 |
| 2023/0137948 | A1 * | 5/2023 | Mukae | B64G 1/244 |
| | | | | 701/13 |
| 2024/0150045 | A1 * | 5/2024 | Stricklan | B64G 1/247 |
| 2024/0255610 | A1 * | 8/2024 | Stevenson | G01S 13/52 |
| 2025/0026499 | A1 * | 1/2025 | Koumandakis | B64G 1/369 |
| 2025/0187757 | A1 * | 6/2025 | Craig | B64G 1/244 |
| 2025/0224506 | A1 * | 7/2025 | Nicolls | G01S 13/06 |

FOREIGN PATENT DOCUMENTS

| | | |
|---|---|---|
| KR | 10-1260411 B1 | 5/2013 |
| KR | 102482462 B1 | 12/2022 |

OTHER PUBLICATIONS

Garber et al., "How has traffic been managed in the sky, on waterways, and on the road? Comparisons for space situational awareness (part 1)", https://www.thespacereview.com/article/3961/1, Jun. 8, 2020 (Year: 2020).*
Lal et al., "Global Trends in Space Situational Awareness (SSA) and Space Traffic Management (STM)", Science & Technology Policy Institute, Apr. 2018 (Year: 2018).*
Rovetto, "An Ontology for Satellite Databases", Earth Sci Inform, 2017 (Year: 2017).*
Xu et al., "An Exploration of Blockchain Enabled Decentralized Capability based Access Control Strategy for Space Situation Awareness", Department of Electrical and Computer Engineering, Binghamton University, 2018 (Year: 2018).*
LeoLabs Visualization and Sign Up Page, retrieved from WayBack Machine (Year: 2022).*
Space-Track.org main page, retrieved from WayBack Machine (Year: 2022).*
Office Action received for Korean Patent Application No. 10-2022-0164272, mailed on Mar. 31, 2025, 14 pages (8 pages of English Translation and 6 pages of Original Document).
Play Channel A, "[Chachacha] Vivid space travel becomes possible! Metaverse meets robotics, metamobility, Happy Morning Episode 751," YouTube, Jan. 10, 2022.
Bullentin of The Korean Space Science Society vol. 31, No. 2 Oct. 2022.

\* cited by examiner

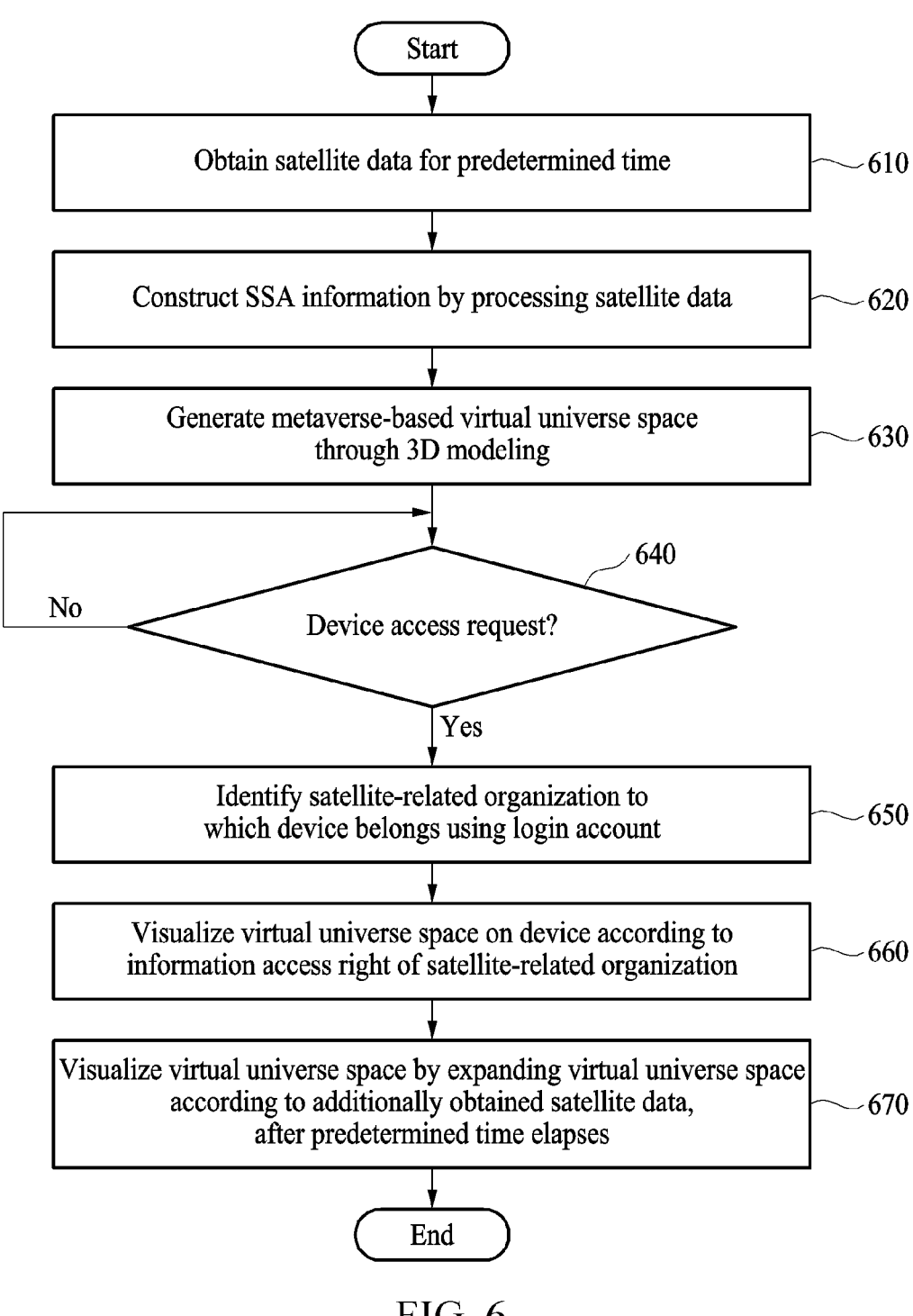

Start

Obtain satellite data for predetermined time ⌐~610

Construct SSA information by processing satellite data ⌐~620

Generate metaverse-based virtual universe space through 3D modeling ⌐~630

640

No      Device access request?

Yes

Identify satellite-related organization to which device belongs using login account ⌐~650

Visualize virtual universe space on device according to information access right of satellite-related organization ⌐~660

Visualize virtual universe space by expanding virtual universe space according to additionally obtained satellite data, after predetermined time elapses ⌐~670

End

METHOD AND SYSTEM FOR OPERATING METAVERSE PLATFORM FOR IMPLEMENTING VIRTUAL UNIVERSE SPACE

CROSS-REFERENCE TO RELATED APPLICATIONS

This application claims the benefit of Korean Patent Application No. 10-2022-0164272 filed on Nov. 30, 2022, in the Korean Intellectual Property Office, the entire disclosure of which is incorporated herein by reference for all purposes.

BACKGROUND

1. Field of Invention

The following description relates to an operating method of a metaverse platform that implements a metaverse-based virtual universe space similar to a real universe space through three-dimensional (3D) modeling of space situational awareness (SSA) information configured based on actual measurement values of satellite data, and provides, in the virtual universe space, modularized functions of sharing infrastructure information for each organization and supporting statistical and analytical research activities based on the SSA information.

2. Description of Related Art

Recently, space activities in all fields of public and private forces around the world are expanding and diversifying, and the importance of space traffic management (STM) and space situational awareness (SSA) is emerging to control traffic of space objects, such as, for example, satellite vehicles that are gradually increasing in number.

In the related art, due to the absence of a platform that supports sharing real-time space situational information observed by a specific organization with other organizations having different infrastructures, there was a need to construct a great amount of infrastructure to obtain all information for organizations in self-sufficient ways. In addition, in the related art, real-time space situational information observed by a specific organization is constructed according to the format used by that organization, and there was a need for an additional data conversion process to convert the format to one used by target organizations to share the information.

In addition, in the related art, there was a difficulty in information sharing because there was a difference in paths through which, after obtaining satellite telemetry data, operators of organizations process data according to respective formats of developers, operators, and related ministry officials and transmit the processed data to them. Moreover, in the related art, real-time space situational information for each organization was generated and shared based on text, which may limit easy and fast recognition of the information.

Accordingly, there is a need to build a platform that supports easy data sharing with organizations through data standardization and implements a multiverse-based virtual universe space of user-friendly user experience (UX)/user interface (UI) (UX/UI) design.

SUMMARY

An objective of embodiments of the present disclosure is to construct a multiverse platform that allows satellite-related organizations to intuitively recognize various types of real-time space situational information more readily and rapidly through a metaverse-based virtual universe space generated through three-dimensional (3D) modeling of space situational awareness (SSA) information that is constructed in real time based on satellite data measured by a satellite vehicle.

An objective of embodiments of the present disclosure is to construct a multiverse platform that allows satellite-related organizations to use SSA information that is consistently described by standardization of a data processing system of a satellite vehicle to use without an additional data conversion task, by processing measured satellite data and constructing the SSA information according to a data standard of the Consultative Committee for Space Data Systems (CCSDS) that is widely used.

An objective of embodiments of the present disclosure is to construct a multiverse platform that supports easy data sharing through data standardization for each of organizations with different infrastructures by providing a sharing function with other devices belonging to other satellite-related organizations in a metaverse-based virtual universe space.

An objective of embodiments of the present disclosure is to construct a multiverse platform that readily generates report data, statistical data, analytical data, research data, and processed data that are to be used as basis data for improving a situation of a satellite vehicle, by providing SSA information-based statistical processing and research functions in a metaverse-based virtual universe space.

An objective of embodiments of the present disclosure is to construct a multiverse platform that modularizes various functions such as a meeting function providing meetings with other devices belonging to other satellite-related organizations, a space traffic management (STM) or space mission design function for a satellite vehicle, a space system or ground infrastructure operating function, and an automatic translation function and provides the modularized functions in a user-friendly user experience (UX)/user interface (UI) (UX/UI) design concept in a metaverse-based virtual universe space.

According to an embodiment of the present disclosure, there is provided a metaverse platform operating method for implementing a virtual universe space, the metaverse platform operating method including: obtaining a plurality of satellite data from a satellite vehicle on a predetermined period for a predetermined time; constructing SSA information associated with the satellite vehicle by processing the plurality of satellite data: generating a metaverse-based virtual universe space in which the satellite vehicle is positioned for the predetermined time, through 3D modeling of the SSA information; at an access request from a device, identifying a satellite-related organization to which the device belongs, using a login account comprised in the access request; and visualizing the metaverse-based virtual universe space on the device according to an information access right of the satellite-related organization.

According to an embodiment of the present disclosure, there is provided a metaverse platform operating system for implementing a virtual universe space, the metaverse platform operating system including: acquisition unit configured to obtain a plurality of satellite data from a satellite vehicle on a predetermined period for a predetermined time: a processing unit configured to construct SSA information associated with the satellite vehicle by processing the plurality of satellite data: a generation unit configured to generate a metaverse-based virtual universe space in which the satellite vehicle is positioned for the predetermined time, through 3D modeling of the SSA information; and a visualization unit configured to, at an access request from a device, identify a satellite-related organization to which the device belongs, using a login account comprised in the access request.

According to the embodiments described herein, 3D datafication of SSA information constructed in real time based on data measured by a satellite vehicle and implementation of a metaverse-based virtual universe space of a user-friendly UX/UI design may support fast and easy recognition of the SSA information through the virtual universe space by devices belonging to satellite-related organizations.

According to the embodiments described herein, data standardization of various real-time space situational information may be used to support easy sharing with satellite-related organizations with different infrastructures, and various functions such as an SSA information-based statistical processing and research function, a meeting function providing meetings with other devices belonging to other satellite-related organizations, a STM or space mission design function, a space system or ground infrastructure operating function, and an automatic translation function, in addition to a data sharing function, may be modularized and provided in a metaverse-based virtual universe space.

According to the embodiments described herein, a metaverse platform technology for implementing a virtual universe space may be widely used by various satellite-related organizations that develop, operate, and utilize space systems including artificial satellites, probes, space robots, and other space equipment, and other SSA and STM related companies or organizations.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 6 is a flowchart illustrating a metaverse platform operating method for implementing a virtual universe space according to an embodiment of the present disclosure.

DETAILED DESCRIPTION

Figure 1:
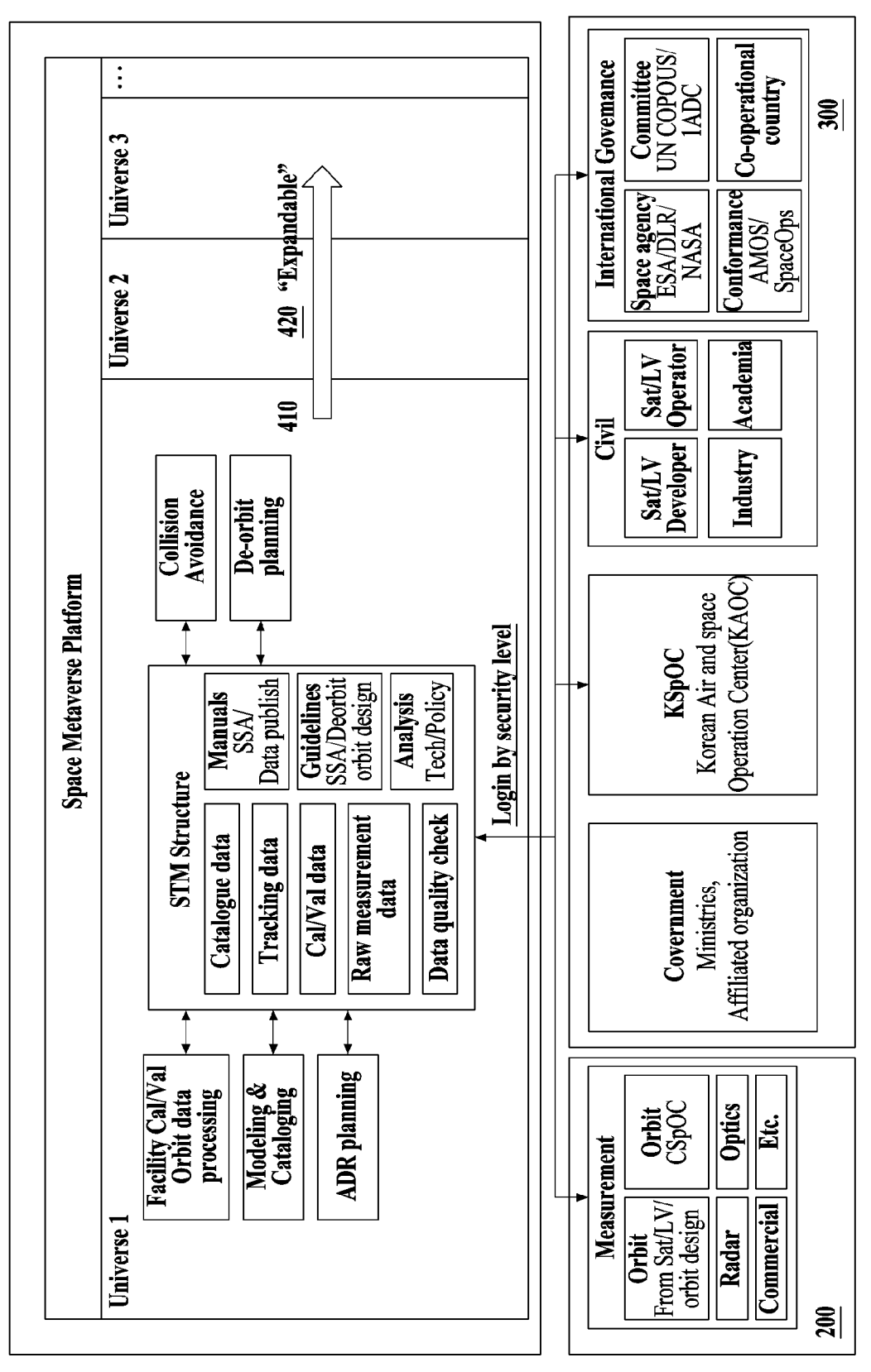
FIG. 1 is a diagram illustrating a network connection relationship among a metaverse platform operating system for implementing a virtual universe space, a satellite vehicle, and a satellite-related organization according to an embodiment of the present disclosure.

Hereinafter, embodiments will be described in detail with reference to the accompanying drawings. It should be understood, however, that there is no intent to limit this disclosure to the particular embodiments disclosed. On the contrary, embodiments are to cover all modifications, equivalents, and alternatives falling within the scope of the embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of embodiments, detailed description of well-known related structures or functions will be omitted when it is deemed that such description will cause ambiguous interpretation of the present disclosure. Regarding the reference numerals assigned to the elements in the drawings, it should be noted that the same elements will be designated by the same reference numerals, wherever possible, even though they are shown in different drawings.

Real-time information acquisition may be practically impossible for an infrastructure possessed by a single satellite-related organization, and thus embodiments of the present disclosure provide a method and system that supports sharing information obtained by organizations participating in a virtual universe space and sharing infrastructures for obtaining the data, and enables the construction of worldwide management systems and the execution of real-time space traffic management (STM) through the data and infrastructure sharing.

The embodiments of the present disclosure provide a method and system that provides a standardized space data system format of the Consultative Committee for Space Data Systems (CCSDS) (which may also be referred to herein as a "CCSDS data standard"), which was formed for smooth cooperations among satellite operating organizations around the world for data sharing, and supports interoperability between space organizations of the Interagency Operations Advisory Group (IOAG) for infrastructure sharing, thereby improving the interoperability for each organization.

The embodiments of the present disclosure provide a method and system that expresses information input in real time in an easier and faster recognizable manner by combining three-dimensional (3D) model data and digital twin technology, rather than a typical method of expressing information in a numerical text-based manner.

The embodiments of the present disclosure provide a method and system that stores, in a private cloud server, information retrieved from other organizations in addition to information possessed by one organization, and stores the information in the form of resulting information obtained through automatic statistical processing, research, processing, and sorting back in the private cloud server, for which statistics, analysis, and research functions may be modularized and implemented in a virtual universe space, and various other functions may be additionally implemented.

The embodiments of the present disclosure provide a metaverse platform operating system for implementing a virtual universe space that may implement a metaverse platform having a function of obtaining quasi-real-time situational information about space objects in a universe space, and a function of processing the information into a format according to data standardization or other reporting format, in addition to a statistical processing and research function.

The embodiments of the present disclosure provide a method and system that implements an expandable platform that provides a data sharing function allowing the interested parties using a universe space to obtain desired information in near real time, enables interoperability-based infrastructure sharing through cooperations with satellite operating organizations, provides real-time space situation and infrastructure situation in an interoperable manner through 3D data generation with a reinforced digital twin function, and modularizes functions of space environment and dynamic models to generate various virtual universe spaces.

The embodiments of the present disclosure provide a method and system that modularizes all functions to implement a metaverse-type virtual universe space of a desired configuration, and constructs a system using a private cloud server that allows devices (e.g., augmented reality (AR), virtual reality (VR), and mobile devices, personal computers (PCs), etc.) belonging to satellite-related organizations to perform activities such as space traffic management (STM) and space mission design, and operating space systems and ground infrastructures, in the virtual universe space.

Representative functions of a metaverse-type virtual universe space implemented according to the embodiments of the present disclosure may include: 1) sharing function for building a global management (or control) system: 2) 3D datafication for easier and faster recognition of all data in a metaverse platform: 3) space situational awareness (SSA) information-based automatic statistical and analytical research function; and 4) common platform for interactions among the interested parties.

Specifically, the embodiments of the present disclosure provide functions of obtaining, processing, storing, and sharing data according to a CCSDS data standard, and provide a function of sharing real-time infrastructure situational information (e.g., in use, service available, under maintenance, etc.) of each organization for interoperability.

In addition, the embodiments of the present disclosure provide a user-friendly user experience (UX)/user interface (UI) (UX/UI) design that converts text-based data such as space environment, weather, proximity, and telemetry information into 3D data, converts information such as orbit, attitude, and physical properties for various situation prediction simulations into 3D data, for easy and fast information recognition.

In addition, the embodiments of the present disclosure provide various functions including a data storage/sharing function (e.g., distribution of sensor measurement values, CDM, TLE, and agency reports), a data statistical function (e.g., the size, mass, and orbit of satellite vehicles), a data analytical function (e.g., space environment changes, available infrastructure information, collision probabilities, etc.), a data research function (e.g., space environment/fragmentation modeling, infrastructure resource planning, etc.), a data processing function (e.g., orbit determination and prediction, image processing, etc.), and a bigdata construction function for improving a situation of a currently operating space system (e.g., satellite vehicles) based on information obtained through statistics, analysis, and research within a metaverse-based virtual universe space.

In addition, the embodiments of the present disclosure provide a method and system that allows space/satellite-related interested parties around the world to readily share numerous ground/space infrastructures, allows related entities such as industry, academia, research institutes, related government ministries/agencies, consultative groups, and the like to readily share information, reinforces security by setting an information access right according to a login account of each organization, and modularizes and provides various functions by providing meetings, seminars, automatic interpretation and translation services within a metaverse-based virtual universe space.

In addition, the embodiments of the present disclosure provide a method and system that enables a management interaction through a mutual procedure establishment for data sharing, collision avoidance, frequency adjustment, and the like between people participating in a metaverse-based virtual universe space, aiming at a common platform that may enable global STM through the mutual procedure establishment in addition to mutual information sharing and opinion sharing between the interested parties belonging to satellite-related organizations.

Specifically, the embodiments of the present disclosure provide a metaverse platform that allows people related to space activities, for example, developers, operators, officials of other organizations, and others to share information including data and infrastructures and other organized results, interact with each other, and execute real-time STM, and provide an expandable metaverse platform that modularizes each function and implements tasks including sporadically developed algorithms, mission design, and simulations, in addition to STM.

FIG. 1 is a diagram illustrating a network connection relationship among a metaverse platform operating system for implementing a virtual universe space, a satellite vehicle, and a satellite-related organization according to an embodiment of the present disclosure.

Referring to FIG. 1, a metaverse platform operating system 100 for implementing a virtual universe space according to an embodiment may be connected to a satellite vehicle 200 and various satellite-related organizations 300 through a network.

The metaverse platform operating system 100 for implementing a virtual universe space may obtain a plurality of satellite data from the satellite vehicle 200 on a predetermined period for a predetermined time; construct real-time space situational awareness (SSA) information associated with the satellite vehicle 200 by processing the obtained plurality of satellite data: generate a metaverse-based virtual universe space 410 in which the satellite vehicle 200 is positioned for the predetermined time through 3D modeling of the constructed SSA information: at an access request from a device belonging to one of the satellite-related organizations 300, verify an information access right of the satellite-related organization 300, using a login account included in the access request; and visualize the metaverse-based virtual universe space 410 on the device of the satellite-related organization 300 in response to the verified information access right.

The satellite vehicle 200, which is at least one of flying vehicles including, for example, an artificial satellite, a probe, a space robot, and other space equipment, may transmit a plurality of satellite data measured using a plurality of mounted measurement sensors to the metaverse platform operating system 100 at predetermined intervals while flying in a real universe space.

The plurality of satellite data may include first measurement data indicating a state of the satellite vehicle 200 itself or internal parts of the satellite vehicle 200, and second measurement data indicating a state of a space environment around the satellite vehicle 200.

The first measurement data may be at least one of position data, temperature data, illuminance data, infrared data, attitude data, and orbit data measured using a position sensor, a temperature sensor, a solar sensor, an infrared sensor, and a gyro sensor provided in the satellite vehicle 200. The second measurement data may be image data captured by a radar or an optical camera provided in the satellite vehicle 200.

The plurality of satellite data may further include telemetry data for communication with a ground control station and other commercial data or meteorological data.

The satellite-related organizations 300 may each be at least one of a government agency, a military agency, an international cooperation organization, a private or civil organization, and a commercial organization, which develops space systems, performs various satellite missions including STM, uses SSA information, or establishes policies on the space environment and the satellite vehicle 200.

The satellite-related organizations 300 may each be granted an information access right when they initially register organization information and login accounts. This may be to allow the metaverse-based virtual universe space 410, which is generated using actual measured satellite data, to be visualized without being exposed without restrictions while maintaining a security level on a device belonging to a permitted satellite-related organization 300.

For example, the metaverse platform operating system 100 may generate catalog data through cataloging that classifies the plurality of satellite data obtained from the satellite vehicle 200 by type and provides identification information: generate modeling data on the space environment and disruption (or fragmentation) using the plurality of satellite data; generate data on facility virtual action learning (VAL)/critical action learning (CAL) using the plurality of satellite data: generate collision avoidance data by processing orbit data; generate active debris removal (ADR) data on an ADR mechanism for removing space debris present in orbit around the Earth using the plurality of satellite data; and construct SSA information including original data and the data generated using the plurality of satellite data.

The SSA information may be constructed in near real time according to a time interval at which satellite data is obtained and be stored in a private cloud server. The SSA information may be constructed in the form of text.

The metaverse platform operating system 100 may generate a 3D metaverse-based virtual universe space (e.g., the virtual universe space 410) that is similar to a real universe space by applying various 3D modeling techniques to the text-type SSA information.

The expression "generating a metaverse-based virtual universe space" or "generating a virtual universe space based on metaverse" used herein may be construed that it allows devices belonging to the satellite-related organizations 300 to mutually exchange various research activities associated with space systems through avatars in the virtual universe space 410 similar to a real universe space.

For example, the metaverse-based virtual universe space 410 may allow each organization to perform statistical, analytical, and research activities for a space system based on SSA information constructed from actual satellite data, and may also allow each organization to perform international cooperation activities through an automatic interpretation and translation function and a meeting/seminar function and perform data sharing activities of sharing real-time infrastructure situation information (e.g., in use, service available, under inspection, etc.).

Accordingly, according to an embodiment, the metaverse-based virtual universe space 410 may be provided to improve the interoperability through research activities based on actual SSA information of the various satellite-related organizations 300.

The metaverse platform operating system 100 may check the information access right granted to each satellite-related organization 300 using a login account that is input at an access request from a device belonging to each satellite-related organization 300, and visualize the metaverse-based virtual universe space 410 on the device of the satellite-related organization 300 with a security level maintained, within a range permitted to the satellite-related organization 300 according to the checked information access right.

According to an embodiment, as a plurality of satellite data is additionally obtained from the satellite vehicle 200 during a first time after the predetermined time, the metaverse platform operating system 100 may process the additionally obtained plurality of satellite data to reconstruct the SSA information, and generate a metaverse-based first virtual universe space 420 in which the satellite vehicle 200 is positioned during the first time through 3D modeling of the reconstructed SSA information.

Subsequently, the metaverse platform operating system 100 may notify the device on which the virtual universe space 410 is visualized of an expandable state of the virtual universe space 410, and at a request for expansion of the virtual universe space 410, may visualize the virtual universe space 410 and the first virtual universe space 420 to be spatially connected on the device.

Figure 2:
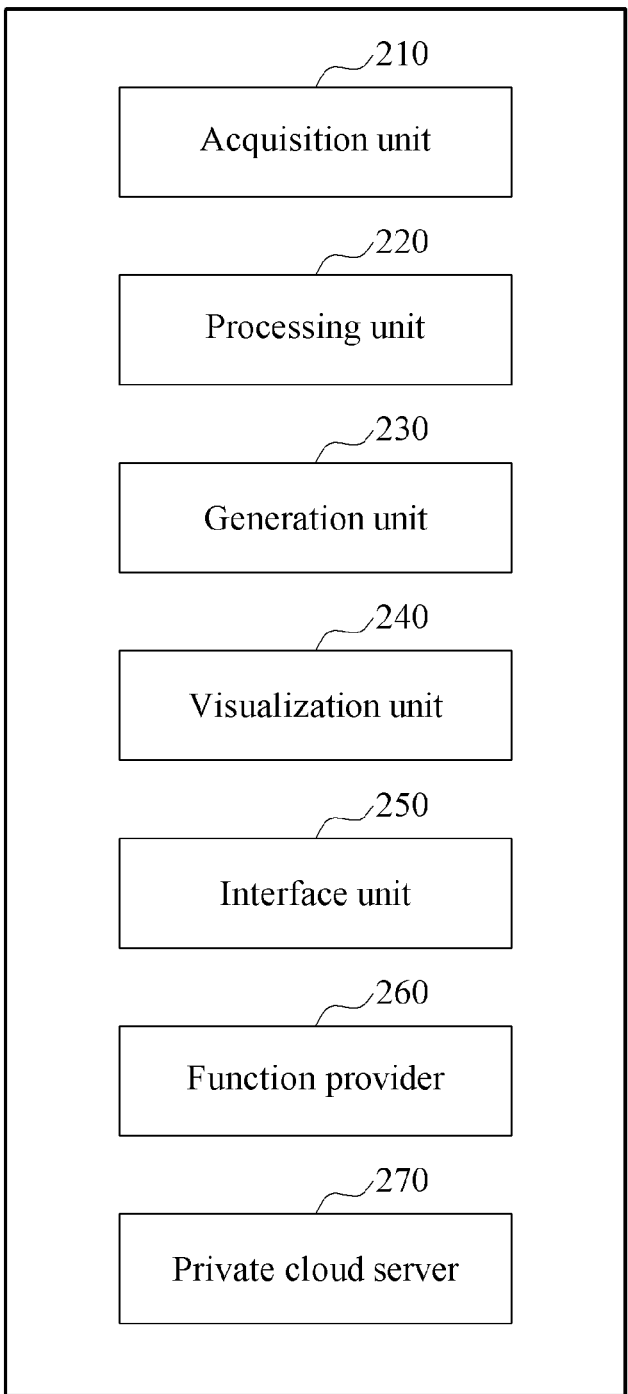
FIG. 2 is a block diagram illustrating an internal configuration of a metaverse platform operating system for implementing a virtual universe space according to an embodiment of the present disclosure.

FIG. 2 is a block diagram illustrating an internal configuration of a metaverse platform operating system for implementing a virtual universe space according to an embodiment of the present disclosure.

Referring to FIG. 2, the metaverse platform operating system 100 for implementing a virtual universe space according to an embodiment may include an acquisition unit 210, a processing unit 220, a generation unit 230, a visualization unit 240, an interface unit 250, a function provider 260, and a private cloud server 270.

The acquisition unit 210 may obtain a plurality of satellite data from a satellite vehicle on a predetermined period for a predetermined time.

The processing unit 220 may process the plurality of satellite data and construct SSA information associated with the satellite vehicle.

For example, the processing unit 220 may process a plurality of text-based satellite data according to a set CCSDS data standard and process the plurality of processed satellite data to construct text-based SSA information.

The CCSDS data standard, which is standard for satellite data widely used in the international space communication field, may be used herein to standardize data processing systems of satellite vehicles and convert various satellite missions into a consistent description to express them in the consistent description.

According to an embodiment, standardizing a data processing system of a satellite vehicle according to the CCSDS data standard may construct consistently described SSA information, and each satellite-related organization may thus use the SSA information without a separate and additional data conversion process.

For example, the plurality of satellite data may include image data captured by a satellite radar or a satellite optical camera provided in the satellite vehicle, orbit data of the satellite vehicle, and current position data of the satellite vehicle. In this example, when the satellite vehicle and another satellite vehicle are identified from the image data among the plurality of satellite data obtained from the satellite vehicle, the processing unit 220 may calculate, as a proximity to the other satellite vehicle, a position difference between a current position of the satellite vehicle and a current position of the other satellite vehicle; calculate, as a collision probability of a collision with the other satellite vehicle, a probability that the proximity recalculated based on a predicted position of the satellite vehicle flying according to the orbit data is within a predetermined distance: in response to the collision probability exceeding a preset threshold value, generate first orbit data that is obtained by modifying the orbit data to avoid the collision: and construct SSA information for STM of the satellite vehicle, the SSA information including original data of the plurality of satellite data, the proximity and the collision probability, and the first orbit data.

For another example, the plurality of satellite data may include measurement data measured by various sensors provided in the satellite vehicle, telemetry (TLE) data of the satellite vehicle, commercial data, and meteorological data. In this example, the processing unit 220 may process the plurality of satellite data to construct the SSA information including at least one of the orbit, attitude, or physical properties of the satellite vehicle for situation prediction simulation.

The generation unit 230 may generate a metaverse-based virtual universe space in which the satellite vehicle is positioned for the predetermined time, through 3D modeling of the SSA information.

The generation unit 230 may generate the metaverse-based virtual universe space in which real-time space situations and infrastructure situations are reflected by performing digital twin-based 3D modeling on such text-based SSA information.

That is, the generation unit 230 may prepare a similar 3D virtual universe space to a real space based on actual measurement values obtained from the satellite vehicle, and generate a metaverse-based virtual universe space in which devices belonging to satellite-related organizations mutually exchange with each other and perform their various research activities for space systems through avatars in the virtual universe space.

The visualization unit 240 may, at an access request for access to the virtual universe space from a device, identify a satellite-related organization to which the device belongs using a login account included in the access request and verify an information access right of the satellite-related organization, and visualize the metaverse-based virtual universe space on the device according to the verified information access right.

As described above, 3D modeling of SSA information that is constructed in real time based on satellite data measured by a satellite vehicle may be used to implement a metaverse-based virtual universe space in which satellite-related organizations recognize various types of real-time space situational information readily, rapidly, and intuitively.

A device capable of accessing the virtual universe space may include all types of devices that may implement the metaverse-based virtual universe space by the 3D modeling, for example, an augmented reality (AR) device, a virtual reality (VR) device, a mobile device, a desktop personal computer (PC), and the like.

In addition, a satellite-related organization described herein may be an organization that may develop space systems, perform STM and various satellite missions, use SSA information, or establish policies on the space environment and satellite vehicles, for example, at least one of a government agency, a military agency, an international organization, a commercial organization, or a private (or civil) organization.

To use the metaverse-based virtual space implemented according to an embodiment, each satellite-related organization may first perform a procedure for registering its organization information and login account, and an information access right may then be granted to each satellite-related organization. For example, the more public an organization is, the higher an information access right to be granted is, that is, for example, a higher information access right may be granted in order, for example, government agency>military agency>international organization>commercial organization>private organization.

This is to ensure that the metaverse-based virtual universe space generated using the satellite data that is actual measurement values is to be visualized with a security level maintained only for a device belonging to a permitted satellite-related organization.

To this end, the generation unit 230 may divide the SSA information and information about the virtual universe space by security level and store them in the private cloud server 270. When the information access right granted to the satellite-related organization matches a security level at which the SSA information is classified in the private cloud server 270, the visualization unit 240 may load the information about the virtual universe space from the private cloud server 270 and visualize it on the device.

That is, when a satellite-related organization to which a device requesting access belongs has the right to access (view/check) SSA information, the visualization unit 240 may visualize, on the device, a metaverse-based virtual universe space generated using the SSA information.

In this case, when the device requesting access has only the right to access a portion of the SSA information, the visualization unit 240 may visualize, on the device, a partial virtual universe space generated based on the portion of the SSA information.

Therefore, according to an embodiment, granting different information access rights to satellite-related organizations in advance through a registration unit (not shown) may grant a higher right to an organization that is more public, for example, and thus, there may be a difference in the range of visualizing a virtual universe space similar to a real universe space that is implemented by actual measurement values obtained from a satellite vehicle according to the information access rights, which may strengthen the security of the SSA information and the virtual universe space.

Depending on embodiments, when the virtual universe space is visualized on the device, the visualization unit 240 may display, on the virtual universe space, an avatar representing the device and avatars representing other devices connected to the virtual universe space.

In this case, the interface unit 250 may display, on the virtual universe space, a modularized function of at least one of a data sharing or meeting function with another device, an STM or space mission design function for the satellite vehicle, a space system or ground infrastructure operating function, an SSA information-based statistical processing and research function, or an automatic translation function.

When the modularized function is selected, the function provider 260 may provide functions, for example, data sharing (e.g., real-time infrastructure information sharing, opinion sharing, etc.), collision avoidance, and frequency adjustment, for global STM through the establishment of mutual interactive procedures between the device and the other devices through the virtual universe space.

For example, when the "data sharing" function of sharing data with the other device is selected by the device, the function provider 260 may convert real-time infrastructure situation information of the satellite-related organization transmitted from the device into a reporting format used by a satellite-related organization to which the other device belongs, and transmit the converted real-time situation information to the other device, thereby supporting real-time infrastructure situation information for each organization through the virtual universe space.

Hereinafter, a process of providing a modularized function in a metaverse-based virtual universe space will be described with reference to FIG. 4.

Figure 4:
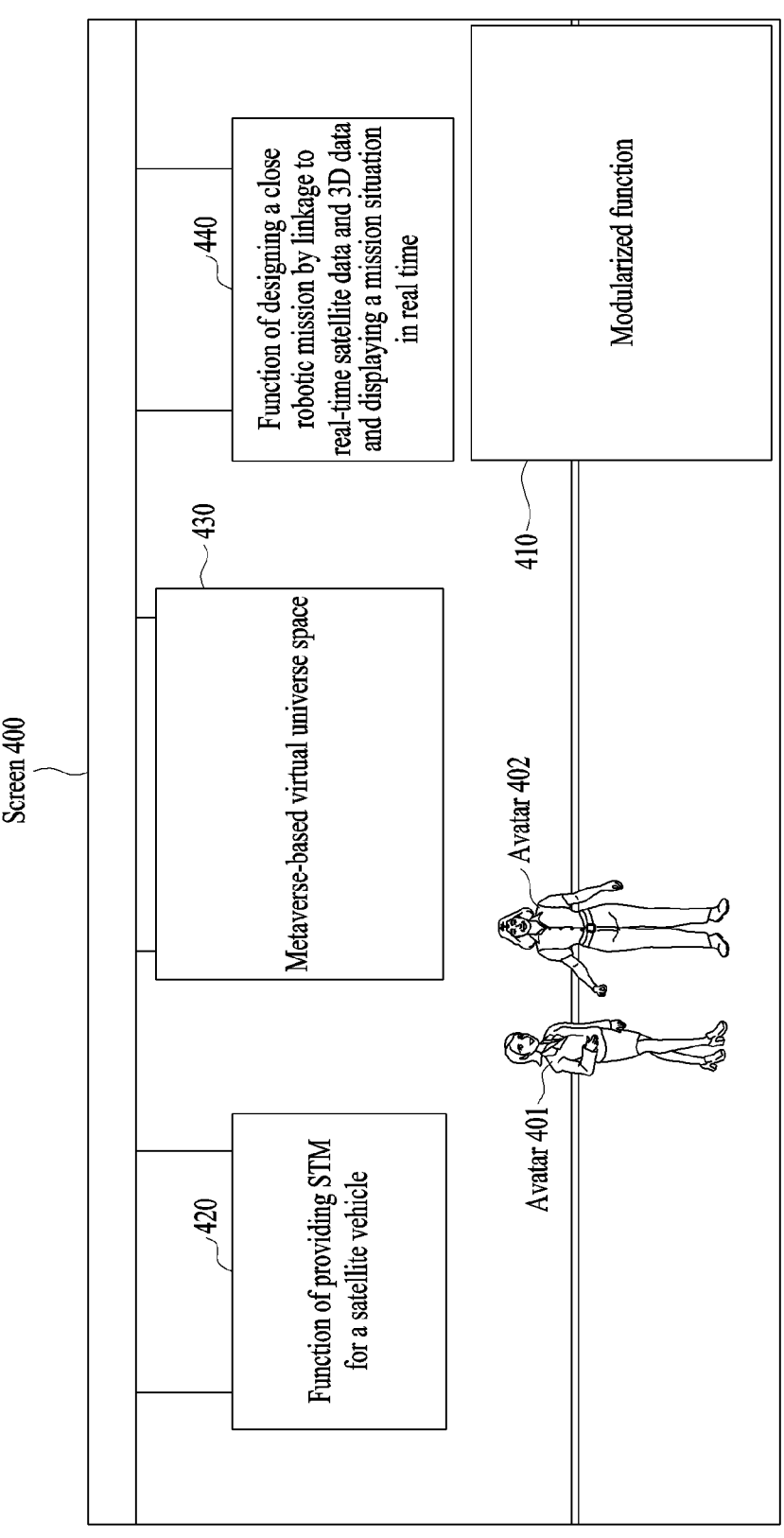
FIG. 4 is a diagram illustrating an example of modularizing and providing various functions within a metaverse-based virtual universe space in a metaverse platform operating system for implementing a virtual universe space according to an embodiment of the present disclosure.

FIG. 4 is a diagram illustrating an example of modularizing and providing various functions within a metaverse-based virtual universe space in a metaverse platform operating system for implementing a virtual universe space according to an embodiment of the present disclosure.

Referring to FIG. 4, when a metaverse-based virtual universe space 430 is visualized on a screen 400 of a device, the visualization unit 240 may display, on the screen 400 of the device, an avatar 401 representing the device and an avatar 402 representing another device connected to the virtual universe space 430, along with the virtual universe space 430.

The interface unit 250 may modularize various functions that the device may be able to perform through the avatar 401 within the metaverse-based virtual universe space 430 and provide them in a user-friendly UX/UI design.

For example, the interface unit 250 may implement (or display) a modularized function 410 of providing meetings and automatic interpretation and translation with the other device (or the avatar 402) connected to the virtual universe space 430, on the virtual universe space 430 visualized on the screen 400 of the device.

The interface unit 250 may also implement (or display), on the virtual universe space 430, a function 420 of providing STM for a satellite vehicle, based on SSA information for the STM that includes first orbit data obtained by modifying orbit data for collision avoidance based on a proximity and a collision probability between the satellite vehicle and another nearby satellite vehicle.

The interface unit 250 may also implement (or display), on the virtual universe space 430, a function 440 of designing a close robotic mission by linkage to real-time satellite data and 3D data and displaying a mission situation in real time.

In addition, when the avatar 401 operated by the device performs a motion, for example, shaking hands with the avatar 402 operated by the other device, on the screen 400 visualized on the device, the function provider 260 may determine that the data sharing function with the other device is selected by the device.

In this case, the function provider 260 may receive, from the device, real-time infrastructure situation information (e.g., in use, service available, under maintenance, etc.) of the satellite-related organization to which the device belongs, convert the information into a reporting format used by a satellite-related organization to which the other device belongs, and transmit the converted real-time situation information to the other device, thereby supporting sharing of real-time infrastructure situation information for satellite-related organizations having different infrastructures.

Therefore, according to an embodiment, providing a sharing function for sharing with another device belonging to another satellite-related organization in a metaverse-based virtual universe space may support easy data sharing through data standardization for respective organizations having different infrastructures.

Hereinafter, a data sharing function for an interaction between satellite-related organizations will be described in more detail with reference to FIG. 5.

Figure 5:
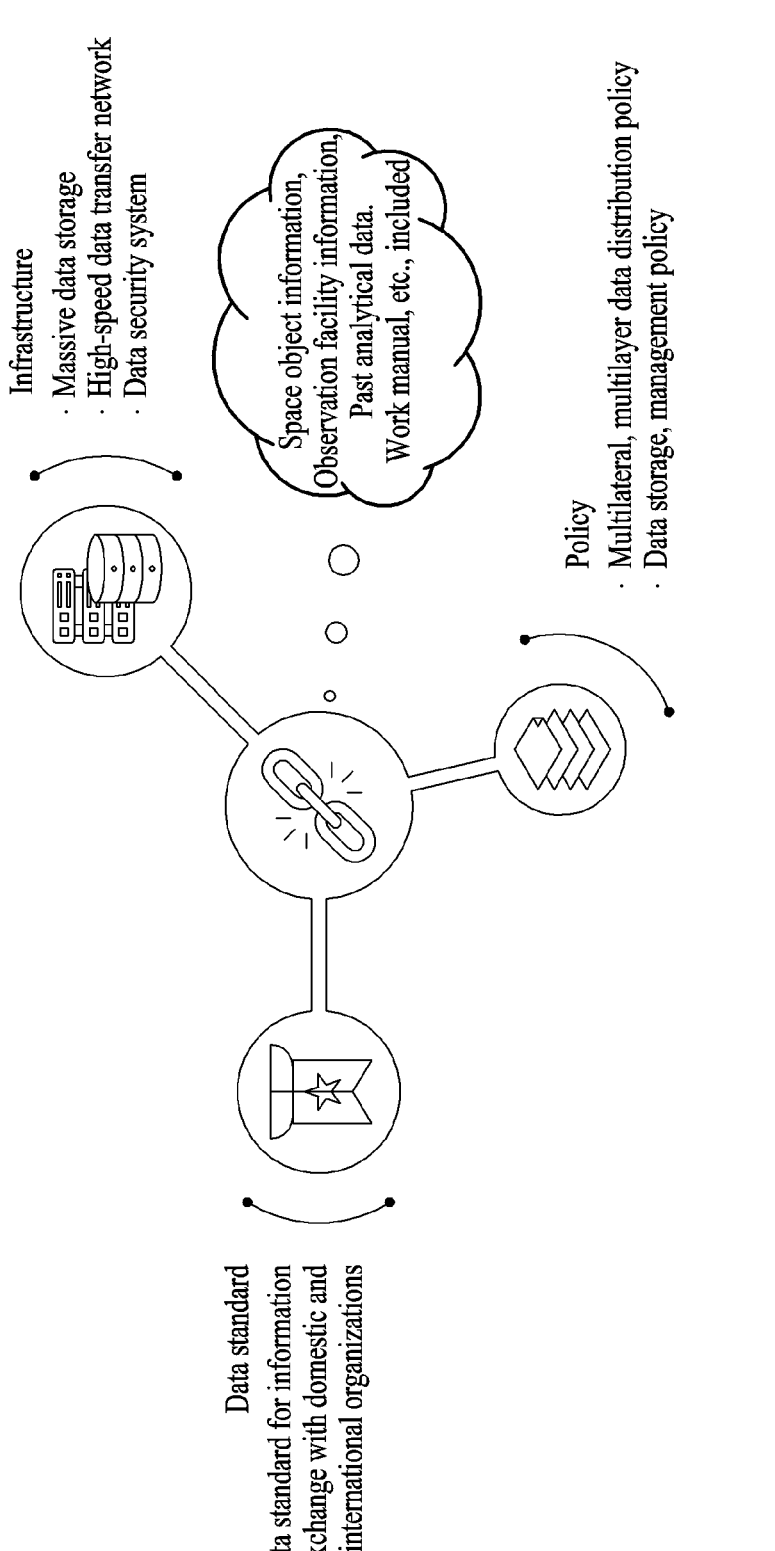
FIG. 5 is a diagram illustrating elements required to implement a data sharing function within a metaverse-based virtual universe space in a metaverse platform operating system for implementing a virtual universe space according to an embodiment of the present disclosure.

FIG. 5 is a diagram illustrating elements required to implement a data sharing function within a metaverse-based virtual universe space in a metaverse platform operating system for implementing a virtual universe space according to an embodiment of the present disclosure.

Referring to FIG. 5, to allow the interested parties of satellite-related organizations to share data (e.g., infrastructure situation information) in real time through a metaverse-based virtual universe space, essential elements such as "data standard," "infrastructure," and "policy" may be required to be defined in advance, and in addition to these, space object information, observation facility information, past analytical data, and work manuals may also be required.

The "data standard" may refer to a standardized standard or specification for information exchanges with domestic and international organizations, and a CCSDS data standard may be used according to an embodiment of the present disclosure. The "infrastructure" may include large-capacity data storage devices that may store various satellite data obtained in real time, SSA information constructed in real time based on the satellite data, and information about a metaverse-based virtual universe space generated based on the SSA information and may also include networks and data security systems for high-speed transmission of massive data. The "policy" may include policies on the data storage and management and a policy on the distribution of multiple data that allows multiple organizations to simultaneously access and use the data.

For another example, when the statistical processing and research function is selected by the device, the function provider 260 may generate report data to be distributed to satellite-related organizations using sensor measurement values and telemetry in the SSA information: generate statistical data on the size, mass, and orbit of the satellite vehicle based on the SSA information: generate analytical data on at least one of space environment changes, available infrastructure information, or collision probability, based on the SSA information: generate research data on at least one of space environment modeling, disruption (or fragmentation) modeling, or infrastructure resource planning, based on the SSA information: generate processed data on at least one of satellite vehicle orbit determination, orbit prediction, or image processing by processing the SSA information: and store the report data, the statistical data, the analytical data, the research data, and the processed data, which are generated based on the SSA information, in the private cloud server 270 along with the SSA information.

Hereinafter, a process of providing an SSA information-based statistical processing and research function in a virtual universe space will be described in detail with reference to FIG. 3.

Figure 3:
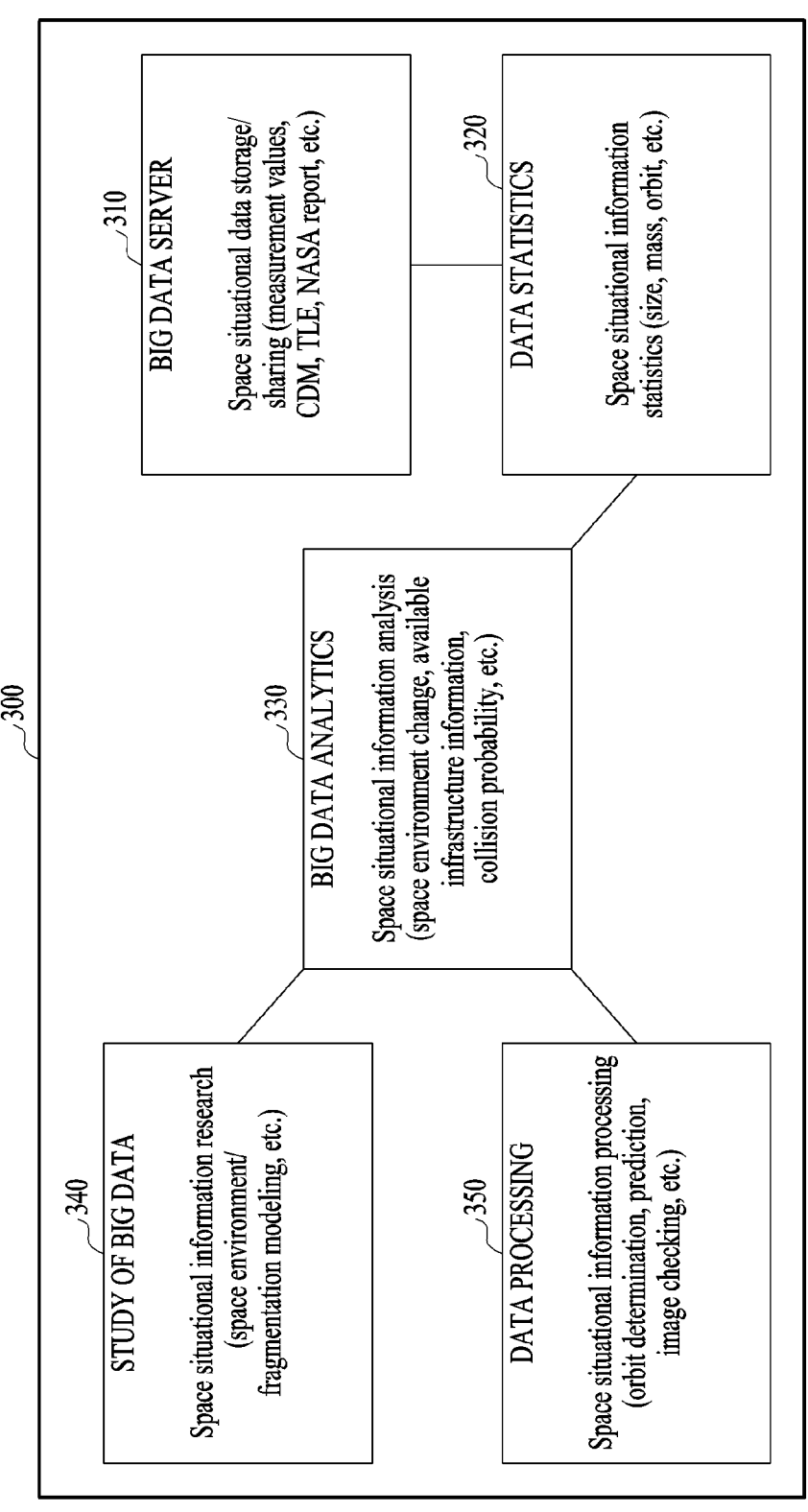
FIG. 3 is a diagram illustrating an example of providing a statistical processing and research function within a metaverse-based virtual universe space in a metaverse platform operating system for implementing a virtual universe space according to an embodiment of the present disclosure.

FIG. 3 is a diagram illustrating an example of providing a statistical processing and research function within a meta-verse-based virtual universe space in a metaverse platform operating system for implementing a virtual universe space according to an embodiment of the present disclosure.

Referring to FIG. 3, the function provider 260 may provide first to fifth functions 310 to 350 that support SSA information-based statistical processing and research on a screen 300 of a device connected to a metaverse-based virtual universe space.

The first function 310 may be a function that supports storing (downloading) of SSA information constructed by actual satellite data such as measurement values of a satellite vehicle, CDM, telemetry (TLE), and the National Aeronautics and Space Administration (NASA) reports, and supports sharing the SSA information with other devices.

The first function 310 may be used to generate report data including the sensor measurement values and telemetry included in the SSA information according to a reporting format used by each satellite-related organization, and share and distribute the information with and to each satellite-related organization.

The second function 320 may be a function that supports the generation of statistical data on the size, mass, and orbit of the satellite vehicle based on the SSA information.

The third function 330 may be a function that supports the generation of analytical data obtained through analyses of space environment changes, available infrastructure information, and collision probabilities of collisions with other satellite vehicles, and the like, based on the SSA information.

The fourth function 340 may be a function that supports the generation of research data on space environment modeling, disruption (or fragmentation) modeling, and infrastructure resource planning based on the SSA information.

The fifth function 350 may be a function that supports the generation of processed data on satellite vehicle orbit determination and prediction and image processing, through the processing of the SSA information.

According to an embodiment, the first to fifth functions 310 to 350 may be modularized and provided on a screen of a device on which a metaverse-based virtual universe space is visualized, through a user-friendly UX/UI. Thus, as the first to fifth functions 310 to 350 are executed by the device, the report data, the statistical data, the analytical data, the research data, and the processed data generated based on the SSA information may be used to construct bigdata for improving a situation of a currently operating space system (or satellite vehicle).

Depending on embodiments, when a plurality of satellite data is additionally obtained by the acquisition unit 210 from the satellite vehicle during a first time after a predetermined time elapses, the processing unit 220 may reconstruct the SSA information by processing the additionally obtained plurality of satellite data, and the generation unit 230 may generate a first metaverse-based virtual universe space in which the satellite vehicle is positioned during the first time through 3D modeling of the reconstructed SSA information.

When the first virtual universe space is generated, the visualization unit 240 may notify the device of an expandable state of the visualized virtual universe space, and at a request for an expansion of the virtual universe space from the device, may visualize the first virtual universe space, along with the virtual universe space, on the device.

For example, referring back to FIG. 1, when the first virtual universe space 420 is generated based on the SSA information reconstructed based on the satellite data additionally obtained during the first time, while the 3D virtual universe space 410 implemented based on the SSA information constructed by the satellite data obtained for the predetermined time is currently on display on the device, the visualization unit 240 may provide a simple notification that the virtual universe space 410 is in an expandable state by displaying a reduced screen (thumbnail) of the first virtual universe space 420 on one side of the virtual universe space 410 that is currently visualized on the device. Similarly, when a second virtual universe space is generated using satellite data obtained during a second time after the first time elapses, the visualization unit 240 may provide a notification that the virtual universe space 410 currently visualized on the device is in a gradually expandable state by displaying a reduced screen of the second virtual universe space on one side of the reduced screen of the first virtual universe space 420.

Subsequently, when the reduced screen of the first virtual universe space 420 is clicked and the expansion of the virtual universe space 410 is requested by the device, the visualization unit 240 may visualize the first virtual universe space 420 to be spatially connected to the virtual universe space 410 that is currently visualized on the device, and as the reduced screen of the second virtual universe space is further clicked by the device, may further visualize the second virtual universe space, thereby implementing a state in which the virtual universe space 410 initially visualized on the device is expanded gradually step by step.

According to an embodiment, it may be possible to implement an expandable platform that may create various virtual universe spaces by modularizing functions such as space environment and dynamic models.

FIG. 6 is a flowchart illustrating a metaverse platform operating method for implementing a virtual universe space according to an embodiment of the present disclosure.

The metaverse platform operating method for implementing a virtual universe space may be performed by the metaverse platform operating system 100 for implementing a virtual universe space described above.

Referring to FIG. 6, in operation 610, the metaverse platform operating system 100 for implementing a virtual universe space may obtain a plurality of satellite data from a satellite vehicle on a predetermined period for a predetermined time.

In operation 620, the metaverse platform operating system 100 for implementing a virtual universe space may construct SSA information associated with the satellite vehicle by processing the plurality of satellite data.

In operation 630, the metaverse platform operating system 100 for implementing a virtual universe space may generate a metaverse-based virtual universe space in which the satellite vehicle is positioned for the predetermined time through 3D modeling of the SSA information.

In operations 640 to 660, at an access request from a device, the metaverse platform operating system 100 for implementing a virtual universe space may identify a satellite-related organization to which the device belongs using a login account included in the access request, and visualize the metaverse-based virtual universe space on the device according to a verified information access right of the satellite-related organization.

In operation 670, when generating a metaverse-based first virtual universe space in which the satellite vehicle is positioned during a first time after the predetermined time elapses through 3D modeling of SSA information that is reconstructed based on a plurality of satellite data additionally obtained during the first time, the metaverse platform operating system 100 for implementing a virtual universe space may visualize the first virtual universe space along with the virtual universe space visualized on the device, thereby implementing a state in which the virtual universe space is gradually expanded.

As described above, according to an embodiment, implementing a metaverse-based virtual universe space of a user-friendly UX/UI design through 3D datafication of SSA information constructed in real time based on data measured by a satellite vehicle may support easy and fast recognition of the SSA information through the virtual universe space by a device belonging to a satellite-related organization.

In addition, according to an embodiment, data standardization of various sets of real-time space situational information may support easy sharing for respective satellite-related organizations having different infrastructures. In addition to such a data sharing function, various functions including, for example, an SSA information-based statistical processing and research function, a meeting function for having a meeting with another device belonging to another satellite-related organization, an STM or space mission design function for a satellite vehicle, a space system or ground infrastructure operating function, and an automatic translation function, may be modularized and provided.

In addition, according to an embodiment, it is possible to implement an expandable platform that may provide a data sharing function allowing the interested parties using a universe space to obtain desired information in near real time; enable interoperability-based infrastructure sharing through cooperation between satellite operating organizations: provide linked real-time space situations and infrastructure situations through the 3D data generation with a reinforced digital twin function, and create various virtual universe spaces through function modularization of space environment and dynamic models.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs: and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A metaverse platform operating method for implementing a virtual universe space, comprising:

obtaining a plurality of satellite data from a satellite vehicle during a predetermined period;

constructing space situational awareness (SSA) information associated with the satellite vehicle by processing the plurality of satellite data obtained during the predetermined period;

generating a metaverse-based virtual universe space in which the satellite vehicle is positioned based on the SSA information constructed from the plurality of satellite data obtained during the predetermined period, through three-dimensional (3D) modeling of the SSA information;

at an access request from a device, identifying a satellite-related organization to which the device belongs, using a login account comprised in the access request;

visualizing the metaverse-based virtual universe space on the device according to an information access right of the satellite-related organization;

displaying an avatar representing another device connected to the virtual universe space on the virtual universe space visualized on the device;

displaying, on the virtual universe space, a modularized function of at least one of a data sharing or meeting function with the other device, an STM or space mission design function for the satellite vehicle, a space system or ground infrastructure operating function, an SSA information-based statistical processing and research function, or an automatic translation function; and when the data sharing function with the other device is selected by the device, supporting sharing of real-time infrastructure situation information for each organization through the virtual universe space, by converting real-time infrastructure situation information of the satellite-related organization transmitted from the device into a reporting format used by a satellite-related organization to which the other device belongs and transmitting the converted real-time infrastructure situation information to the other device.

2. The metaverse platform operating method of claim 1, further comprising:

as a plurality of satellite data is additionally obtained from the satellite vehicle during a first period after the predetermined period, reconstructing the SSA information by processing the additionally obtained plurality of satellite data;

when a metaverse-based first virtual universe space in which the satellite vehicle is positioned based on the reconstructed SSA information obtained during the first period is generated through 3D modeling of the reconstructed SSA information, notifying the device of an expandable state of the virtual universe space visualized on the device; and at a request for an expansion of the virtual universe space by the device, visualizing, on the device, the first virtual universe space along with the virtual universe space.

3. The metaverse platform operating method of claim 1, wherein the plurality of satellite data comprises image data captured by a satellite radar or a satellite optical camera provided in the satellite vehicle, and orbit data and current position data of the satellite vehicle, wherein the constructing of the SSA information comprises:

when another satellite vehicle is identified from the image data captured by the satellite vehicle, calculating a position difference between a current position of the satellite vehicle and a current position of the other satellite vehicle as a proximity to the other satellite vehicle;

calculating a probability that the proximity, which is recalculated based on a predicted position of the satellite vehicle flying according to the orbit data, is to be within a predetermined distance, as a collision probability of a collision with the other satellite vehicle;

in response to the collision probability exceeding a predetermined threshold value, generating first orbit data obtained by modifying the orbit data to avoid the collision with the other satellite vehicle; and constructing SSA information for space traffic management (STM) of the satellite vehicle, the SSA information comprising original data of the plurality of satellite data, the proximity and the collision probability, and the modified orbit data.

4. The metaverse platform operating method of claim 1, wherein the plurality of satellite data comprises measurement data measured by a sensor provided in the satellite vehicle, telemetry (TLE) data of the satellite vehicle, commercial data, and meteorological data, wherein the constructing of the SSA information comprises:

constructing the SSA information comprising at least one of an orbit, an attitude, or a physical property of the satellite vehicle for situation prediction simulation by processing the plurality of satellite data.

5. The metaverse platform operating method of claim 1, further comprising:

processing a plurality of text-based satellite data according to a set data standard of the Consecutive Committee for Space Data Systems (CCSDS); and constructing text-based SSA information by processing the processed plurality of text-based satellite data, wherein the generating of the virtual universe space comprises:

generating the virtual universe space in which real-time space situations and infrastructure situations are reflected, through digital twin-based 3D modeling of the SSA information.

6. The metaverse platform operating method of claim 1, further comprising:

classifying the SSA information and information about the virtual universe space by security level and storing the classified information in a private cloud server, wherein the visualizing on the device comprises:

when the information access right granted to the satellite-related organization identified as any one of a government agency, a military agency, an international organization, a commercial organization, or a private organization matches a security level at which the SSA information is classified in the private cloud server, loading the information about the virtual universe space from the private cloud server and visualizing the loaded information on the device.

7. The metaverse platform operating method of claim 1, further comprising:

when the SSA information-based statistical processing and research function is selected by the device, generating report data to be distributed to each satellite-related organization, using sensor measurement values and telemetry in the SSA information;

generating statistical data on the size, mass, and orbit of the satellite vehicle, based on the SSA information;

generating analytical data of at least one of a space environment change, available infrastructure information, or a collision probability, based on the SSA information;

generating research data of at least one of space environment modeling, disruption modeling, or infrastructure resource planning, based on the SSA information;

generating processed data of at least one of orbit determination, orbit prediction, or image processing of the satellite vehicle, by processing the SSA information; and storing, in a private cloud server, the report data, the statistical data, the analytical data, the research data, and the processed data generated based on the SSA information, along with the SSA information.

8. A non-transitory computer-readable storage medium storing instructions that, when executed by a processor, cause the processor to perform the metaverse platform operating method of claim 1.

9. A metaverse platform operating system for implementing a virtual universe space, comprising:

acquisition unit configured to obtain a plurality of satellite data from a satellite vehicle during a predetermined period;

a processing unit configured to construct space situational awareness (SSA) information associated with the satellite vehicle by processing the plurality of satellite data obtained during the predetermined period;

a generation unit configured to generate a metaverse-based virtual universe space in which the satellite vehicle is positioned based on the SSA information constructed from the plurality of satellite data obtained during the predetermined period, through three-dimensional (3D) modeling of the SSA information;

a visualization unit configured to, at an access request from a device, identify a satellite-related organization to which the device belongs, using a login account comprised in the access request;

an interface unit configured to: as an avatar representing another device connected to the virtual universe space is displayed on the virtual universe space visualized on the device, display, on the virtual universe space, a modularized function of at least one of a data sharing or meeting function with the other device, an STM or space mission design function for the satellite vehicle, a space system or ground infrastructure operating function, an SSA information-based statistical processing and research function, or an automatic translation function; and a function provider configured to: when the data sharing function with the other device is selected by the device, support sharing of real-time infrastructure situation information for each organization through the virtual universe space, by converting real-time infrastructure situation information of the satellite-related organization transmitted from the device into a reporting format used by a satellite-related organization to which the other device belongs and transmitting the converted real-time infrastructure situation information to the other device.

10. The metaverse platform operating system of claim 9, wherein, as a plurality of satellite data is additionally obtained by the acquisition unit from the satellite vehicle during a first period after the predetermined period, the processing unit is configured to reconstruct the SSA information by processing the additionally obtained plurality of satellite data, and the generation unit is configured to generate a metaverse-based first virtual universe space in which the satellite vehicle is positioned based on the reconstructed SSA information obtained during the first period through 3D modeling of the reconstructed SSA information, and when the first virtual universe space is generated, the visualization unit is configured to notify the device of an expandable state of the virtual universe space visualized on the device; and at a request for an expansion of the virtual universe space by the device, visualize, on the device, the first virtual universe space along with the virtual universe space.

11. The metaverse platform operating system of claim 9, wherein the plurality of satellite data comprises image data captured by a satellite radar or a satellite optical camera provided in the satellite vehicle, and orbit data and current position data of the satellite vehicle, wherein the processing unit is configured to:

when another satellite vehicle is identified from the image data captured by the satellite vehicle, calculate a position difference between a current position of the satellite vehicle and a current position of the other satellite vehicle as a proximity to the other satellite vehicle;

calculate a probability that the proximity, which is recalculated based on a predicted position of the satellite vehicle flying according to the orbit data, is to be within a predetermined distance as a collision probability of a collision with the other satellite vehicle;

in response to the collision probability exceeding a predetermined threshold value, generate first orbit data obtained by modifying the orbit data to avoid the collision with the other satellite vehicle; and construct SSA information for space traffic management (STM) of the satellite vehicle, the SSA information comprising original data of the plurality of satellite data, the proximity and the collision probability, and the first orbit data.

12. The metaverse platform operating system of claim 9, wherein the plurality of satellite data comprises measurement data measured by a sensor provided in the satellite vehicle, telemetry (TLE) data of the satellite vehicle, commercial data, and meteorological data, wherein the processing unit is configured to:

construct the SSA information comprising at least one of an orbit, an attitude, or a physical property of the satellite vehicle for situation prediction simulation by processing the plurality of satellite data.

13. The metaverse platform operating system of claim 9, wherein the processing unit is configured to:

process a plurality of text-based satellite data according to a set data standard of the Consecutive Committee for Space Data Systems (CCSDS), and construct text-based SSA information by processing the processed plurality of text-based satellite data, wherein the generation unit is configured to:

generate the virtual universe space in which real-time space situations and infrastructure situations are reflected, through digital twin-based 3D modeling of the SSA information.

14. The metaverse platform operating system of claim 9, wherein the generation unit is configured to:

classify the SSA information and information about the virtual universe space by security level and store the classified information in a private cloud server, wherein the visualization unit is configured to:

when an information access right granted to the satellite-related organization identified as any one of a government agency, a military agency, an international organization, a commercial organization, or a private organization matches a security level at which the SSA information is classified in the private cloud server, load the information about the virtual universe space from the private cloud server and visualize the loaded information on the device.

15. The metaverse platform operating system of claim 9, wherein, when the SSA information-based statistical processing and research function is selected by the device, the function provider is configured to:

generate report data to be distributed to each satellite-related organization, using sensor measurement values and telemetry in the SSA information; generate statistical data on the size, mass, and orbit of the satellite vehicle, based on the SSA information; generate analytical data of at least one of a space environment change, available infrastructure information, or a collision probability, based on the SSA information; generate research data of at least one of space environment modeling, disruption modeling, or infrastructure resource planning, based on the SSA information; generate processed data of at least one of orbit determination, orbit prediction, or image processing of the satellite vehicle, by processing the SSA information; and store, in a private cloud server, the report data, the statistical data, the analytical data, the research data, and the processed data generated based on the SSA information, along with the SSA information.

\* \* \* \* \*